Patented Jan. 31, 1950

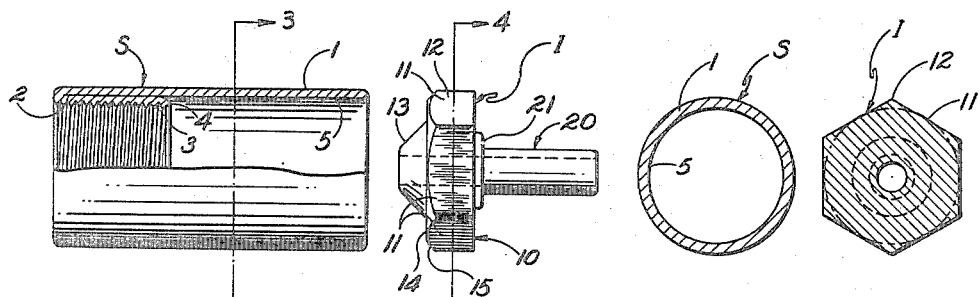
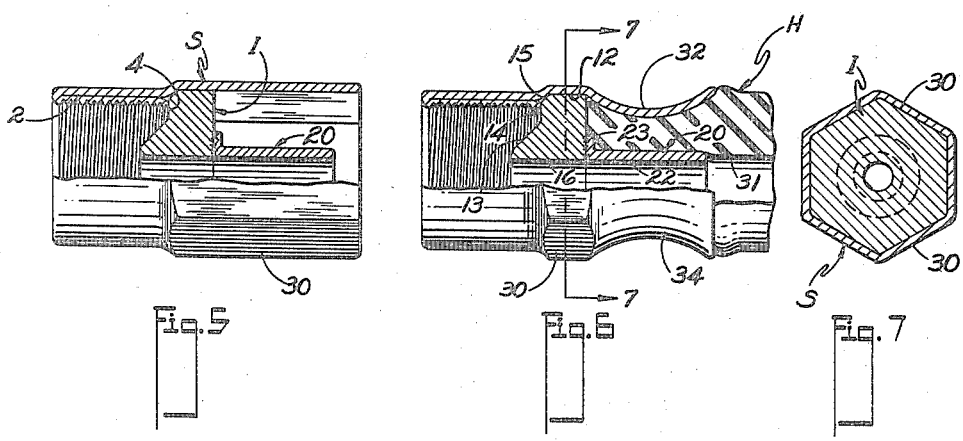
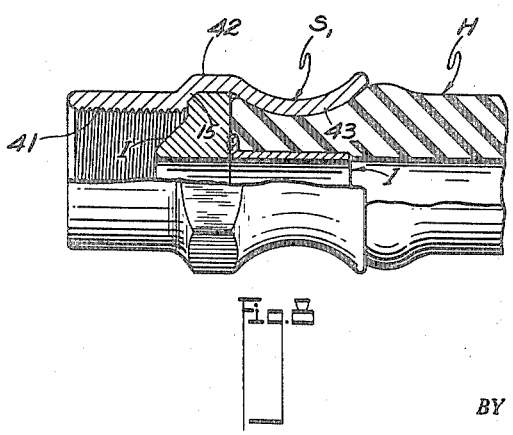
INVENTOR.
LOUIS B. COURTOT

2,496,037

UNITED STATES PATENT OFFICE 2,496,037

COMPOSITE HOSE END

Louis B. Courtot, Cleveland, Ohio, assignor to The Weatherhead Company, Cleveland, Ohio, a corporation of Ohio Original application May 10, 1947, Serial No. 747,196. Divided and this application June 11, 1948, Serial No. 32,468

3 Claims. (Cl. 285—84)

This invention relates to methods of making composite hose ends or couplings of the type which are crimped or fastened to a hose and have means for connection to an associated coupling or fitting member.

This application is a division of Serial Number 747,196, filed May 10, 1947, containing claims to the method of making the hose end.

It has been proposed to manufacture hose ends and coupling members of the type to which this invention relates in an economical manner by building the hose end up of several parts and fastening them together. Such a construction is often more economical than one wherein the coupling is machined from a solid blank and, furthermore, the composite construction permits use of materials for the various elements best adapted to withstand the service they encounter. However, it is preferable that the insert be retained in the shell before the hose is attached which normally requires an extra operation. Also, if the shell is tubular, one or more separate operations are required to provide a wrench-receiving exterior. It is an object of this invention to provide a coupling member that has all the advantages of a retained insert and wrench-receiving portion, but which is produced by a minimum of simple operations.

Briefly, in a preferred embodiment of my invention I produce a hose end by assembling a tubular sheet metal shell or body member with an insert member of hexagonal cross-section, the insert having corner portions of greater diameter than the nominal internal diameter of the tubular shell. By forming the insert with the beveled nose I may press it into the shell, which stretches the metal of the shell locally so that it assumes the configuration of the exterior of the insert. This retains the insert in the shell and provides an external wrench-receiving portion on the shell. I complete the assembly by crimping the rearward portion of the shell (through which the insert was pressed) about a hose member. Thus, not only am I able to form a composite hose end and make the insert and shell of materials suitable for their service, but I can assemble the parts quickly and economically. The single act of pressing in the insert not only retains it in the shell before assembly with the hose, but produces an external wrench-receiving portion on the shell. Another object resides in production of a coupling of the type described wherein the wrench-receiving portion found on the shell is backed up so that it cannot collapse under tool pressure.

A more detailed description of my invention appears in connection with the drawings in which:

Fig. 1 is a partial section of the shell or body member after having a portion thereof being folded over and threaded, but before insertion of the insert member;

Fig. 2 is an external view of the insert member;

Fig. 3 is a section through the tubular body member taken on 3—3 of Fig. 1;

Fig. 4 is a section of the insert taken on 4—4 of Fig. 2;

Fig. 5 is a partial section through the coupling after the insert has been pressed in the body;

Fig. 6 is a partial section through the coupling after it has been clamped about a hose;

Fig. 7 is a section taken on 7—7 of Fig. 6; and

Fig. 8 is a section of a modified form.

As seen in Fig. 1, the body member S is made up of a length of cylindrical tubing 1 which has a portion 2 folded back thereon to provide adequate metal for the threads 3. The end of the folded back portion 2 forms a shoulder 4 against which the insert abuts after assembly. The internal diameter 5 of the shell is made of proper size to receive the insert as will be described in more detail presently.

Insert I includes a body 10 preferably machined or turned from a bar of hexagonal stock on automatic screw machinery. The finished insert has a hexagonal portion with flats 11 bounded by corners 12. A forwardly facing conical nose 13 is provided on the insert for fluid engagement with a flared tube or other coupling or fitting member, threaded into threads 3 of the fitting in the conventional manner. A generally radical shoulder 14 is provided on the insert for engagement with the shoulder 4 of the shell S after assembly of the parts. A nipple or standpipe 20 is formed separately, by stamping or drawing, or on eyelet machines and attached to the insert. Nipple 20 includes a flange 21 which is welded, soldered, or brazed as at 23 to the insert proper. The insert and standpipe are apertured as at 16 and 22, respectively, to conduct fluid.

After the parts are formed as shown, the insert is pressed into the shell from the rear as shown in Fig. 5. The forward beveled portion 15 facilitates initial entry of the insert into the shell. I prefer that the inner diameter 5 of the shell be approximately equal to the diameter across the flats 11 of the hexagonal insert section, as illustrated by the dot-dash line in Fig. 4. Thus, when the insert is pressed into the shell, the corners of the insert expand and stretch the metal of the shell which, in turn, causes the shell to tightly grip and retain the insert. If the sizes of the parts are properly selected, the shell will hug and press against the hexagonal section of the insert. After the radial shoulder 14 of the insert engages the shoulder 4 of the shell, initial assembly of the hose end is completed. Not only is the insert firmly retained in place at this stage so that the unit can be handled and shipped before assembly with the hose, but the exterior wrench-receiving surfaces 30 as shown in Figs. 6 and 7 are simultaneously provided on the shell without need of any further stamping, drawing or machining operations.

Although I prefer that the diameter of the inscribed circle of the hexagonal insert equal the inner diameter of the shell, I contemplate that modifications may be made in the relationship of these diameters. However, I prefer that the perimeter of the insert exceed that of the shell's inner surface so that the majority of the metal in the shell wall is locally stretched by the insert.

As seen in Fig. 6, when it is desired to assemble the hose end with a hose H, standpipe 20 is inserted into the aperture 31 of the hose and portion 32 of the shell is crimped about the hose firmly retaining the insert in place thereon in fluid-tight relationship. I may crimp the shell in such a manner so that the rearward hexagonal portion that surrounds the hose is made substantially circular as shown at 34. In use, no leakage can occur regardless of the nature of the fit between the exterior of the insert and the shell because the conical nose 13 makes a fluid-tight engagement with the flaring tube or coupling member associated with the fitting and no fluid can leak out around the exterior of the insert.

It is important to note that in my improved construction the corners of the wrench-receiving portion are backed up by the insert so that a tool or wrench cannot collapse the shell corners and so damage the coupling.

Although, in the interests of economy and saving of material, I prefer to form the shell by doubling back a portion 2 which receives threads and forms a shoulder 4, I could use thicker material throughout and roll or cut threads in the forward end of the sleeve. Such an arrangement is shown in Fig. 8 wherein the shell S₁ is of heavier metal and threads 41 are formed in a forward end portion of single thickness. Wrench-engaging corners 42 are formed on the sleeve when the insert is assembled, as described, and the rearward shell portion is crimped about hose H as shown at 43.

Although I have illustrated my invention as applied to a crimped hose end, those skilled in the art will appreciate that the principles of my invention may be employed in connection with the production of hose ends or coupling members which do not have a rearward crimped portion.

Although I have illustrated a polygonal insert hexagonal in form, it will be understood that my non-circular section formed with suitable flats to provide wrench-receiving surfaces may be assembled with a sleeve in accordance with the principles of my invention without departing from its spirit.

I contemplate that various details of design and construction may be modified without departing from the essence of my invention and although I have described in detail a preferred embodiment I contemplate that the appended claims and not the described embodiment be determinative of the scope of my invention.

What is claimed is:

1. A coupling member comprising a tubular body member and an axially apertured insert member having axially extending flats about its periphery disposed in the body member, the perimeter of said insert at the flats being greater than the inner circumference of portions of said body member disposed to one side of said insert, the wall of said body member being about said flats being stretched and in pressure engagement with said flats to grip said insert in said body member, with the portion of said body member surrounding the flats on said insert configured like the periphery of said insert and providing a non-circular wrench-receiving surface.

2. A hose end assembly comprising a tubular body member and an axially apertured insert member of polygonal cross-section disposed in the body member, a standpipe extending rearwardly from said insert, the corners of said insert having a greater radial dimension than the radius of portions of said body member disposed to one side of said insert, the wall of said body member being stretched at the corners of said insert and in pressure engagement with corner portions of the non-circular surface of the insert to retain said insert in said body member and the portion of said body member surrounding the non-circular portion of said insert having a polygonal wrench-receiving surface, a hose inserted in said body with said standpipe extending to the hose passageway, portions of said body surrounding said hose being crimped about the hose at portions aligned with said insert corners.

3. A coupling member comprising a tubular body member having an internally-threaded coupling portion and a hose-receiving portion, said threaded portion including a wall that is a continuation of said hose-receiving portion, an axially apertured insert member having a portion of polygonal cross-section disposed in the body member, the corners of said insert having a greater radial dimension than the radius of said continuing threaded wall portion of said body member, the wall of said body member being in a stretched condition adjacent the corners of said insert for resilient pressure engagement with the periphery of said insert to retain said insert in said body, the balance of the wall of said hose-receiving portion having a polygonal configuration like that of said insert.

LOUIS B. COURTOT.

REFERENCES CITED

The following references are of record in the file of this patent:

UNITED STATES PATENTS

| Number | Name | Date |
| --- | --- | --- |
| 1,678,640 | Hall | July 31, 1928 |
| 1,954,989 | Eastman | Apr. 17, 1934 |
| 2,432,598 | Weatherhead, Jr. | Dec. 16, 1947 |